Patented May 26, 1942

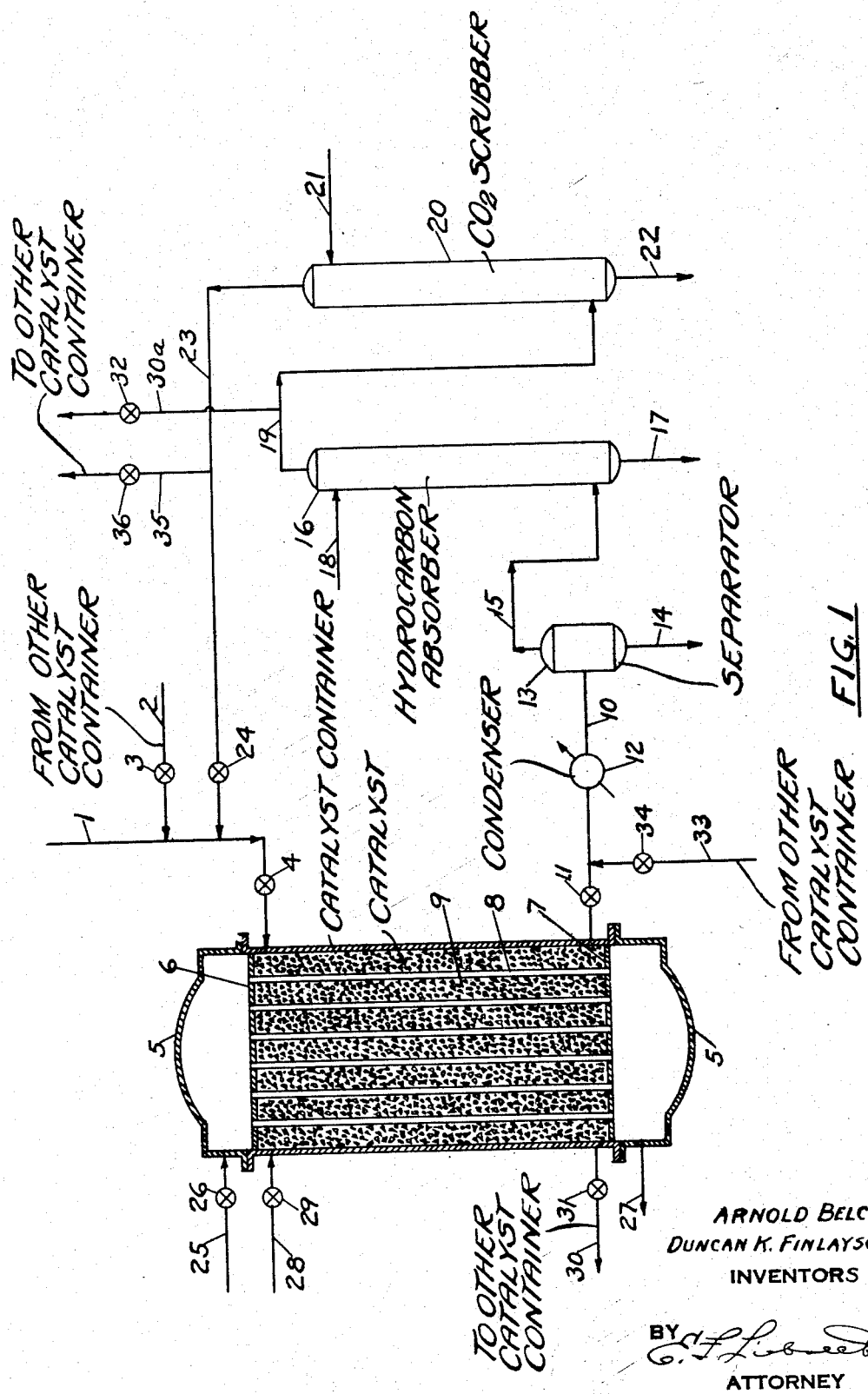

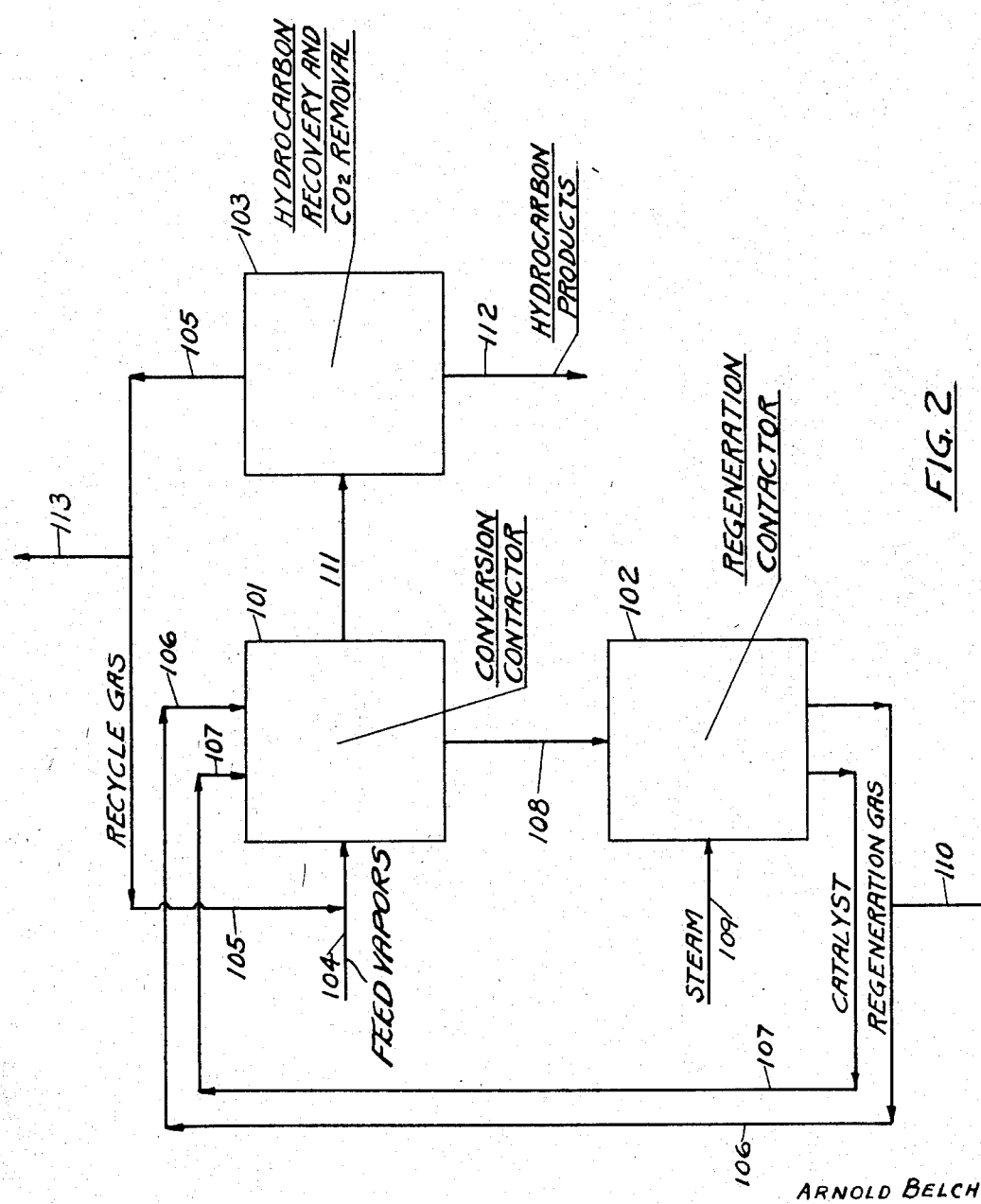

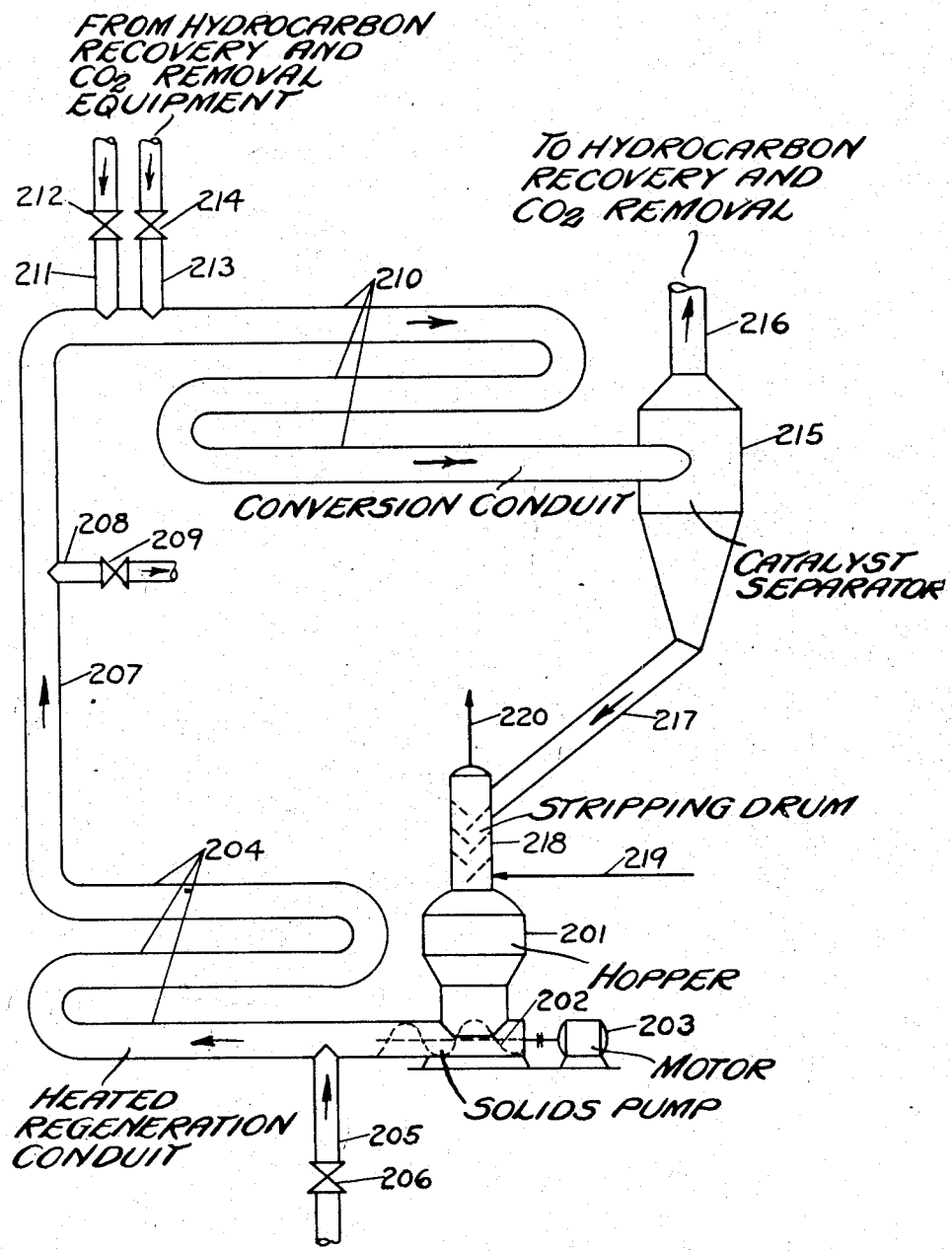

UNITED STATES PATENT OFFICE 2,284,603

PROCESS FOR THE CATALYTIC CONVERSION OF HYDROCARBONS

Arnold Belchetz, Kew Gardens, and Duncan Kenneth Finlayson, Hartsdale, N. Y., assignors to The M. W. Kellogg Company, Jersey City, N. J., a corporation of Delaware Application February 2, 1940, Serial No. 316,908

5 Claims. (Cl. 196—52)

The present invention relates to catalytic hydrocarbon processes in which hydrocarbon conversion is accompanied by the deposition of carbonaceous material upon the catalyst and particularly to processes wherein carbonaceous matter is removed from a used catalyst by contacting it with steam under conditions favorable to the interaction of steam and carbon to form hydrogen and carbon oxides.

It is a primary object of the invention to provide a catalytic hydrocarbon process in which gaseous products of a catalyst revivification step are utilized in a conversion step, whereby the coupling of the two steps is simplified and hitherto unavoidable intervening steps are eliminated. Other objects and advantages of the invention will appear from the detailed description which follows.

The invention contemplates contacting hydrocarbon vapors with a catalyst in a conversion zone, simultaneously contacting a carbon-coated used catalyst with steam in a regeneration zone and maintaining the regeneration zone under conditions favorable to the reaction of steam with carbon according to a modified form of the "water gas" reaction, i. e., as indicated by the equation (1) $\quad C + H_2O \rightarrow H_2 + aCO + bCO_2$ where $a$ and $b$ are coefficients which vary with temperature and with the quantity of steam present. In the conventional "water gas" reaction the temperature and steam concentration are adjusted so that $a$ is large with respect to $b$ while the modified reaction made use of in this invention is effected at a temperature and with an excess of steam such that $b$ is large with respect to $a$. The resultant mixture of hydrogen, carbon dioxide, excess steam, and minor quantities of carbon monoxide is withdrawn from the regenration zone and all or a portion thereof introduced into the conversion zone with the hydrocarbon vapors to be converted. At the same time the regenerated catalyst from which carbonaceous material has been removed is intermittently or continuously substituted in place of catalyst which has acquired a like deposit of carbon in the conversion zone.

In the regeneration of catalysts which have had their activity impaired by carbon deposition during a hydrocarbon conversion step, it is known to employ air or air-flue gas mixtures and the like as carbon-removing media, and by their use to burn off carbon. Regeneration by combustion suffers from a number of disadvantages, however, chiefly the following:

1. The regeneration reaction is exothermic, and introduces a difficult problem of temperature control if overheating of the catalyst and impairment of its activity is to be avoided.

2. The regenerating media, because of their oxidizing effect, enter into undesired reactions with hydrocarbons at high temperatures and mixtures of the two may be dangerously explosive. This fact necessitates freeing the catalyst of regeneration gas completely prior to the reestablishment of conversion.

3. Regeneration products are of no further value to the process except that they may contain recoverable heat. This heat can only be recovered by indirect exchange, which is relatively inefficient in the gas phase.

According to the present invention, it is proposed to subject a carbon-coated catalyst to the action of steam under conditions such that in Equation 1 coefficient $b$ will be large and coefficient $a$ will be small. The progress of this reaction is governed by the mass-action law and the expression for equilibrium is $$\frac{(CO)(H_2O)}{(CO_2)(H_2)} = K$$

where K is proportional to temperature and varies from about 0.2 at 1000° F. to about 2.0 at 2000° F. It will be seen that the maximum formation of $CO_2$ and the minimum formation of CO are favored by decreasing temperature and increasing steam concentration. There are other limitations which prevent fixing these variables at any desired point, however, for the reaction rate becomes to slow below about 1100° F. and beyond a certain point excess steam increases the cost of lines and other equipment. Ordinarily we prefer to work within the temperature range 1100° to 1600° F. and with not less than about 8 mols of steam per mol of carbon to be removed. With these conditions it is possible to reduce the carbon monoxide formation to less than 0.2 mol per mol of carbon reacting, or in other words to maintain a formation ratio of $CO_2$ to CO of at least 4 to 1.

Having allowed the carbon-coated catalyst and steam to remain in contact for a length of time sufficient to remove the desired amount of carbon, we withdraw the gaseous products of regeneration from the regeneration zone and immediately introduce all or a portion thereof into the conversion zone, together with hydrocarbon vapors to be converted. This step confers advantages on the process in a variety of different ways, depending upon the type of hydrocarbon conversion being effected and the manner of contacting employed in conversion and regeneration. The achievement of these advantages in exemplary embodiments of the invention will now be more fully described with reference to the annexed drawings, in which:

Fig. 1 is a diagrammatic flow-sheet with parts in sectional elevation, showing one form of the invention in which a catalyst is disposed in two or more reactors to which hydrocarbons are directed alternately, so that while the catalyst in one or more reactors is contacting hydrocarbons the catalyst in the remaining reactors is undergoing regeneration in situ. This is the "intermittent" type of process previously referred to.

Fig. 2 is a purely diagrammatic flow sheet showing another embodiment of the invention in which we employ a single reactor into and from which catalyst and hydrocarbons are continuously introduced and withdrawn, and a separate regenerator into which carbon-coated catalyst is continuously introduced and regenerated catalyst continuously withdrawn.

Fig. 3 is a flow sheet showing the manner of using one type of contacting device in the process shown by Fig. 2.

Hydrocarbon conversions to which the invention is applicable are typified by catalytic cracking and catalytic dehydrogenation. The following more detailed description of the invention will be given with reference to the catalytic dehydrogenation of a low-octane naphtha for the purpose of enhancing the anti-knock properties thereof, which process embodies the invention so that a maximum number of its advantages are attained. It is to be understood, however, that the various other types of dehydrogenation processes, such as the conversion of paraffins to olefins, naphthenes, or aromatics may be effected with equal advantage by means of the invention, and that the operating conditions mentioned hereafter with respect to the conversion in no way limit the scope of the invention.

In Fig. 1, the construction of a catalyst container 5 is like that of a conventional single-pass shell-and-tube heat exchanger. A body of catalyst 9 is disposed between upper and lower tube sheets 6 and 7 and surrounds tubes 8. The construction shown is purely exemplary, as any type of container may be used provided that the catalyst is in contact with heat-transferring surfaces. As a catalyst we may employ oxides of the metals of the sixth group such as chromium or molybdenum, supported on alumina, or any suitable dehydrogenation catalyst.

Pursuant to the exemplary process, vapors of a low-octane naphtha are taken from any suitable source and passed through line 1. Regeneration gas from an adjoining catalyst container in which regeneration is taking place as will be hereinafter described is passed through line 2 controlled by valve 3 into line 1 for admixture with the naphtha vapors therein. Additionally, a recycle gas comprising hydrogen and normally gaseous hydrocarbons is passed through line 23 controlled by valve 24 into line 1 for admixture with naphtha vapors to be converted. The final mixture of naphtha vapors, regeneration gas and recycle gas, suitably under a pressure of about 50 to 500 pounds and preferably 200 to 300 pounds, is passed into container 5 below upper tube sheet 6 and into contact with catalyst 9. The temperature of the mixture entering the container may be between about 900° F. and 1050° F., about 980° F. being preferred. Naphtha vapors and recycle gas entering line 1 are raised to the chosen reaction temperature by direct heat exchange with the regeneration gas, which will be available at about 1100° to 1600° F. The naphtha vapors are preheated in any suitable manner to such a temperature that the additional heat in the regeneration gas will suffice to bring the final mixture to the desired reaction temperature.

After entering the container 5 the reactants pass downwardly through catalyst 9, at which the desired dehydrogenation reaction takes place. This reaction is an endothermic one and if desired a heating medium such as hot flue gas or excess regeneration gas may be passed through line 25 controlled by valve 26 into the space above tube sheet 6, downwardly through the tubes and out through line 27. The application of heat to the reaction is not essential, for the reactants may be introduced at a temperature sufficiently above the desired reaction temperature to compensate for the temperature drop as endothermic heat is absorbed.

After traversing the catalyst bed 9 conversion products pass out of container 5 through line 10 controlled by valve 11 and are cooled in condenser 12 to condense normally liquid hydrocarbons and excess steam originally present in the regeneration gas.

The mixture of liquid and gaseous conversion products passes on through line 10 to separator 13 where disengagement of the two phases occurs. Condensed steam and normally liquid hydrocarbons comprising the desired naphtha of enhanced anti-knock properties are withdrawn from separator 13 through line 14 while uncondensed gases pass overhead through line 15 to the base of an absorber 16.

Passing upwardly through absorber 16 the uncondensed gases countercurrently contact a liquid absorbing medium which is introduced at the top of the absorber through line 18. The absorbing medium may be gas oil or other material suitable for the recovery of light hydrocarbons from gaseous mixtures containing them. Passing downwardly through the absorber 16 the absorbing medium picks up at least a portion of the $C_3$ hydrocarbons in the uncondensed conversion products and substantially all the $C_4$ and heavier hydrocarbons present therein. If desired a second stage of absorption may be employed further to reduce the hydrocarbon content of the gas mixture.

The enriched absorbing medium is withdrawn from the base of absorber 16 through line 17 and the absorbed hydrocarbons removed therefrom suitably by steam distillation, after which the stripped medium may be used to absorb additional quantities of hydrocarbons.

Unabsorbed gases, after the withdrawal of any excess not needed further in the process through line 30a and valve 32, pass overhead from the absorber through line 19 to the base of a scrubber 20 into which a $CO_2$-absorbing liquid such as diamino propanol is introduced through line 21. Scrubber 20 functions like absorber 16 to remove carbon dioxide from the gas entering it, the $CO_2$-laden absorbent being withdrawn through line 22 for stripping and reuse. If desired the $CO_2$ scrubber may precede the hydrocarbon absorber.

The $CO_2$-free gas, now comprising hydrogen, normally gaseous hydrocarbons and minor quantities of carbon monoxide passes overhead through line 23 controlled by valve 24 and enters line 1, as previously described, for admixture with naphtha vapors to be converted. The gas thus recycled comprises all of the carbon monoxide and at least a portion of the hydrogen which were originally introduced in the regeneration gas stream flowing through line 2, plus hydrogen produced in the dehydrogenation reaction, plus light hydrocarbon by-products of the dehydrogenation.

In dehydrogenating a naphtha characterized by a high hydrogen production, such as for example a sulfur-free straight-run naphtha, it may be that the hydrogen in the regeneration gas will alone be sufficient for the purposes of the invention, in which case the overhead from absorber 16 can be discarded or burned as fuel. A portion must be discarded through line 35 in any event to prevent the accumulation of carbon monoxide in the system.

As the process thus far described continues, a deposit of carbon or carbonaceous material will gradually accumulate on catalyst 9 and reduce its activity. When this reduction has become excessive valves 3, 4, 11, and 24 are closed and the flow of naphtha vapors is diverted to an adjoining container the catalyst in which has just been regenerated. Valve 34 is opened so that conversion products from the adjoining container may pass through line 33 into line 10 and thence through condenser 12, separator 13, absorber 16 and scrubber 20, while valve 36 is opened to permit passage of recycle gas through line 35 back to the adjoining container. In this manner the operation of the hydrocarbon recovery system and $CO_2$ scrubber is made continuous notwithstanding the alternating cycles of conversion and regeneration in the containers.

To start the regeneration of the catalyst 9 in container 5 valve 29 is opened to admit steam to the catalyst through line 28. This steam passes downwardly through the catalyst and is withdrawn through line 30 controlled by valve 31, which is also opened.

The steam is introduced at the same pressure as that maintained during conversion and preferably at a temperature of 1000° F. to 1700° F. At the same time a heat-carrying fluid such as flue gas at 1200° F. to 1700° F. is admitted to the tubes 8 through line 25 and valve 26. The quantity of this hot fluid admitted is so regulated as to maintain the desired regeneration temperature, which may be between 1100° and 1600° F. as previously mentioned, in the mass of catalyst 9.

In passing downwardly through the catalyst 9 the superheated steam will be decomposed by hot carbonaceous matter into hydrogen and oxides of carbon. In order to influence the course of this reaction in the direction of maximum $CO_2$ and minimum CO formation, more steam is introduced than can be decomposed during a single pass through the catalyst, so that excess undecomposed steam is present in the regeneration gases issuing through line 30. The excess steam suppresses the formation of CO, or if any has been formed, reacts with it to form $CO_2$ and hydrogen. In accordance with the mass action law and the equilibrium constant previously referred to, the CO formation may be reduced to any reasonable figure by passing steam through the catalyst at a sufficiently high rate. We prefer to regulate the steam rate so that the regeneration gas will analyze not more than about 20% CO on a dry, $CO_2$-free basis and preferably less than 10%.

Regeneration gas is withdrawn from the container 5 through line 30 and at least a portion thereof is passed into an adjoining container in admixture with hydrocarbons to be converted, through a line equivalent to line 2 in Figure 1. Any regeneration gas not so used may be burned as fuel or its sensible heat transferred to a simultaneously occurring conversion or both. When the regeneration of catalyst 9 is complete the flow of superheated steam and high temperature heating medium is interrupted by closing valves 29, 31 and 26. Immediately thereafter and without the interposition of a purging step, as would be necessary with combustion regeneration, the flow of hydrocarbon vapors to the catalyst is resumed by opening valves 3, 4, 11 and 24.

Discussing now the advantages of introducing the regeneration gas into the conversion zone of a dehydrogenation process, it will be noted that naphtha vapors to be treated do not reach a dehydrogenation temperature until they meet the hot regeneration gas entering line 1 through line 2. Upon meeting this gas stream the naphtha vapors are almost instantaneously raised to the desired conversion temperature and immediately contact the catalyst, so that undesirable thermal cracking reactions do not have time to occur. This advantage may be attributed to the direct transfer of heat from hot regeneration gas to naphtha vapors, which is inherently much faster and more efficient than indirect transfer, such as must be employed when the regeneration gas may contain oxygen.

The presence of hydrogen in a zone of catalytic hydrocarbon conversion is frequently desirable and in many cases indispensible. It has been found that in carbon-producing processes the presence of hydrogen tends to reduce carbon deposition so that the active life of the catalyst between regenerations is lengthened. In catalytic reforming hydrogen is even more beneficial since by varying its concentration in the conversion zone it is possible to control the degree of dehydrogenation so as to obtain exactly the type of product desired. From the term "dehydrogenation" it might be assumed that hydrogen is obtained as a by-product of the process, and indeed this is often the case, but in dehydrogenating certain high-sulfur naphthas the conversion of sulfur to hydrogen sulfide consumes hydrogen as fast as it is produced. Also the removal of sulfur by this reaction from a compound of the thiophene type leaves an open carbon ring which takes on hydrogen at the point of scission. Therefore, the dehydrogenation of sulfurous naphthas ordinarily requires that hydrogen be manufactured by some means for admixture with the feed. By the use of the invention, however, there will be excess hydrogen always available in quantities more than sufficient to offset the hydrogen-consuming tendency of a sulfurous feed.

The invention is of utility to no less a degree when applied to processes of the continuous or moving catalyst type, and an exemplary embodiment of it in such a process will now be described with reference to Figure 2. Moving catalyst processes are characterized by the employment of contacting devices in which a continuously moving stream of catalytic material meets and contacts a stream of fluid material, which may flow concurrently or countercurrently therewith. After a finite contact time the two streams leave the contacting device separately or combined, as desired.

Figure 2 is a purely diagrammatic flow sheet in which squares identified by legends represent pieces or groups of apparatus. The lines connecting the squares represent the paths and indicate the destinations of streams of material rather than pipes through which such streams might be passed. It is to be understood that control over the various streams is obtained by the provision of valves where necessary or desirable. Squares 101 and 102, bearing the legends "Conversion contactor" and "Regeneration contactor" respectively, represent any suitable devices for contacting fluid and pulverulent streams of material. Square 103 represents a fractionating or separating system such as was described with reference to Figure 1, including in that figure condenser 12, separator 13, absorber 16 and scrubber 20.

As in Figure 1, a steam of vaporized low-octane naphtha is passed through line 104 and is joined by a stream of recycle gas entering through line 105. The combined stream goes to the conversion zone comprised by contactor 101 and is joined therein by a stream of regeneration gas introduced via line 106. It is not to be understood that the naphtha vapors must be mixed with recycle gas before entering the conversion zone, or that the regeneration gas must enter the conversion zone separately. All that is necessary is that the three streams enter the zone.

Freshly regenerated catalyst is continuously introduced into contactor 101 by line 107, and while progressing toward its point of withdrawal comes in contact with sufficient naphtha vapor to acquire a deactivating coating of carbonaceous material. Leaving contactor 101 along line 108 the used catalyst goes to regeneration contactor 102, into which steam for regeneration is being passed along line 109. The modified water gas reaction takes place in contactor 102 while the steam and catalyst are in contact, and regenerated catalyst passes out along line 107 for return to contactor 101 as previously described. Regeneration gas is returned by way of line 106 to contactor 101 also after rejecting a portion through line 110, if desired.

Gaseous conversion products are withdrawn from contactor 101 along line 111 and go to the hydrocarbon recovery and $CO_2$ removal system 103, wherein separation of the various components is effected as described with reference to Figure 1. The desired naphtha of improved octane number is released along line 112 while recycle gas goes back to contactor 101 via line 105, a portion being bled off as desired through line 113.

Referring now to Figure 3 for a more specific description of a continuous moving catalyst process and one type of contacting device suitable for use therewith, the vessel numbered 201 is a hopper containing used catalyst bearing a coating of carbon. In the process, used catalyst introduced into hopper 201 drops into a solids pump or screw conveyor 202 driven by motor 203 and is forced into an elongated conduit 204. A current of superheated steam enters conduit 204 through line 205 controlled by valve 206 and picks up the pulverulent catalyst and holds it in suspension. Heat is supplied to conduit 204 in any suitable manner, for example by surrounding it with hot products of combustion, and the steam-catalyst suspension passing therethrough is maintained at a temperature favorable to the modified water gas reaction as previously described. The length of the heated portion of conduit 204 is made great enough to permit the reaction of the steam with the carbon on the catalyst to go to the desired extent therein, so that a suspension of regenerated catalyst in a mixture of hydrogen, carbon dioxide, excess steam and carbon monoxide will issue from the heated portion of conduit 204.

It will be seen that the items of equipment thus far described perform all the necessary functions of the regeneration contactor referred to in connection with Figure 2 and designated therein by the square 102. This method of contacting has certain advantages over the static bed method illustrated by Figure 1. Firstly, the transfer of heat to the regeneration reaction is much improved because of the high velocity of the steam suspension past the heat-transferring surface; and secondly, it is not necessary to use so great an excess of steam because carbon dioxide, once formed, does not have to pass through layers of carbon-bearing catalyst which would tend to reduce it to carbon monoxide.

Leaving conduit 204 the suspension of regenerated catalyst travels through a connecting conduit 207 from which excess regeneration gas may be withdrawn if desired through line 208 and valve 209. The escape of catalyst with regeneration gas may be prevented by means of a screen or by the use of a small cyclone separator.

The hot suspension flowing through line 207 next enters a conversion conduit 210, constructed similarly to the regeneration conduit 204, and externally heated if desired. Vapors of a naphtha to be dehydrogenated join the suspension via line 211 and valve 212, and are heated to conversion temperature by direct heat exchange with hot catalyst and regeneration gas. At an adjacent point the recycle gas taken from a hydrocarbon recovery and $CO_2$ removing system are introduced into conduit 210 through line 213 and valve 214. The final mixture of regeneration gas, recycle gas, naphtha vapors to be dehydrogenated and suspended catalyst passes through conduit 210 under dehydrogenating conditions and remains therein for a time sufficient to ensure the desired extent of conversion. During this period the catalyst acquires a deposit of carbonaceous material.

Issuing from conduit 210 the suspension of contaminated catalyst in gaseous conversion products enters a separator 215, suitably of the cyclone centrifugal type, wherein separation of the catalyst from the suspending gas occurs. Gaseous conversion products pass overhead through line 216 to a hydrocarbon recovery and $CO_2$ removal system while used catalyst drops through line 217 into a stripping drum 218. A current of steam introduced through line 219 passes upwardly through stripping drum 218 and strips residual hydrocarbon vapors from the catalyst, leaving the drum through line 220. The stripped catalyst drops through the bottom of the drum 218 into hopper 201, where it is ready to undergo another cycle of regeneration as previously described.

It will now be seen that conduit 210 in conjunction with separator 215, line 217, and drum 218 performs the functions of the conversion contactor referred to in connection with Figure 2 and designated therein by the square 102.

It is to be understood that the invention is applicable not only to the suspension type of moving catalyst contactor, but is of utility with other types as well. For example, it is feasible to introduce the catalyst continuously into an elongated vertical drum by means of a star feeder or the like and to pass naphtha vapors or steam therethrough, while withdrawing contaminated or regenerated catalyst from the bottom of the drum and transferring it to a complementary contactor drum in which the other stage of the process takes place. The latter arrangement permits, in addition to concurrent flow, counterflow or cross-flow of catalyst and gas which of course, is not possible in a suspension.

A fact contributing to the practicability of the invention is the many catalysts for hydrocarbon conversion are also catalysts for the water gas reaction. Chromium oxide, a commonly used dehydrogenation catalyst, exhibits this property.

While we have described our invention with respect to various specific examples and have illustrated various preferred forms of apparatus for carrying out the various operations incident to our process, it will be understood by those skilled in the art that our invention is not limited to such operative or mechanical details except in so far as set forth in the claims hereinafter made.

We claim:

1. A process for the catalytic conversion of hydrocarbons including the steps of contacting hydrocarbon vapors with a catalyst in a conversion zone, contacting steam with a catalyst having carbonaceous material deposited thereon in a regeneration zone under conditions favorable to the interaction of steam and carbon to form hydrogen and carbon dioxide, withdrawing gaseous products of regeneration from said regeneration zone and introducing at least a part of the regeneration products into said conversion zone simultaneously with hydrocarbon vapors to be converted.

2. A process for the catalytic conversion of hydrocarbons in the presence of hydrogen wherein carbonaceous matter is deposited upon the catalyst during conversion including the steps of continuously introducing hydrocarbon vapors, a hydrogen-containing gas, and a catalyst, into a conversion zone, withdrawing gaseous conversion products from said zone, separating said gaseous products into a hydrogen-free fraction and a second fraction containing a major proportion of hydrogen, using a portion of said second fraction as a component of the hydrogen-containing gas introduced into said conversion zone, recovering the desired hydrocarbon products from said hydrogen-free fraction, continuously withdrawing catalyst with carbonaceous matter deposited thereon from said conversion zone, contacting said catalyst with steam in a regeneration zone under conditions favorable to the reaction of steam with carbon to form hydrogen, carbon dioxide and a minor proportion of carbon monoxide, withdrawing regenerated catalyst from said regeneration zone for reuse in the process, withdrawing gaseous regeneration products from said regeneration zone, and using at least a part of said gaseous regeneration products as a component of the hydrogen-containing gas introduced into said conversion zone.

3. A process for the catalytic conversion of hydrocarbons in the presence of hydrogen wherein carbonaceous matter is deposited upon the catalyst during conversion including the steps of continuously introducing hydrocarbon vapors and a suspension of catalyst in a hydrogen and carbon dioxide-containing gas into a conversion zone, catalytically converting said hydrocarbon vapors in said zone, withdrawing gaseous conversion products from said zone, separating said gaseous conversion products into a hydrogen-free fraction and a second fraction containing hydrogen and carbon dioxide, recovering the desired hydrocarbon products from said hydrogen-free fraction, separating carbon dioxide from said second fraction and using a portion of the carbon dioxide-free second fraction as a component of the hydrogen and carbon dioxide containing gas introduced into said conversion zone, continuously withdrawing catalyst with carbonaceous material deposited thereon from said conversion zone, forming a suspension of said catalyst in steam, passing said suspension through a regeneration zone maintained at a temperature favorable to the reaction of steam with carbon to form hydrogen, carbon dioxide, and a minor proportion of carbon monoxide, withdrawing a suspension of regenerated catalyst in a hydrogen and carbon-dioxide-containing gas from said regeneration zone, and using said last mentioned suspension as the suspension introduced into said conversion zone.

4. A method of catalytically converting hydrocarbon fractions which comprises passing a gaseous stream including hydrogen and vapors of the hydrocarbons undergoing treatment and having a finely divided catalyst suspended therein through a reaction zone maintained under conversion conditions, separating the used catalyst from the gaseous conversion products, forming a suspension of the separated catalyst in steam, passing the suspension through a regeneration zone maintained under conditions favorable to the reaction of steam with carbon to form hydrogen, carbon dioxide, and a minor proportion of carbon monoxide, mixing products of regeneration including the regenerated catalyst and regeneration gases with additional hydrocarbons, and passing the suspension thus produced to the reaction zone.

5. A method of catalytically reforming hydrocarbon fractions containing a substantial proportion of aliphatic compounds which comprises passing a gaseous stream including hydrogen and vapors of the hydrocarbons undergoing treatment having a finely divided hydrogenation and cyclicization catalyst suspended therein through a reaction zone maintained under conditions adapted to cause a substantial quantity of the aliphatic compounds to be dehydrogenated and cyclicized to aromatic compounds, separating the used catalyst with carbonaceous material produced by the reforming reaction deposited thereon from the gaseous reaction products, forming a suspension of the separated catalyst in steam and passing the suspension through a regeneration zone heated to a temperature adapted to cause interaction between the steam and carbonaceous material present on the catalyst with formation of carbon dioxide and hydrogen therefrom, mixing products of regeneration including the regenerated catalyst and gases with additional hydrocarbons and passing the suspension thus produced to the reaction zone.

ARNOLD BELCHETZ.
DUNCAN KENNETH FINLAYSON.

CERTIFICATE OF CORRECTION.

Patent No. 2,284,603.  May 26, 1942.

ARNOLD BELCHETZ, ET AL.

It is hereby certified that error appears in the printed specification of the above numbered patent requiring correction as follows: Page 1, first column, line 41, for "regenration" read --regeneration--; and second column, line 37, for the word "to" read --too--; page 4, first column, line 16, for "steam" read --stream--; and second column, line 24-25, for "regerenation" read --regeneration--; page 5, first column, line 9, for "the" before "many" read --that--; and second column, line 49, claim 5, for "hydrogenation" read --dehydrogenation--; and that the said Letters Patent should be read with this correction therein that the same may conform to the record of the case in the Patent Office.

Signed and sealed this 21st day of July, A. D. 1942.

(Seal)

Henry Van Arsdale,
Acting Commissioner of Patents.